US009778693B2

(12) United States Patent
Yeh et al.

(10) Patent No.: US 9,778,693 B2
(45) Date of Patent: Oct. 3, 2017

(54) DOCKING STATION AND ELECTRICAL APPARATUS

(71) Applicants: Hsin Yeh, Taipei (TW); Jyh-Chyang Tzou, Taipei (TW); Wei-Hao Lan, Taipei (TW); Tzu-Fang Huang, Taipei (TW)

(72) Inventors: Hsin Yeh, Taipei (TW); Jyh-Chyang Tzou, Taipei (TW); Wei-Hao Lan, Taipei (TW); Tzu-Fang Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/168,249

(22) Filed: May 31, 2016

(65) Prior Publication Data

US 2016/0349794 A1 Dec. 1, 2016

Related U.S. Application Data

(60) Provisional application No. 62/168,922, filed on Jun. 1, 2015.

(51) Int. Cl.
*G06F 1/16* (2006.01)
*G06F 3/01* (2006.01)
(Continued)

(52) U.S. Cl.
CPC .......... *G06F 1/1632* (2013.01); *G06F 1/1618* (2013.01); *G06F 1/1673* (2013.01);
(Continued)

(58) Field of Classification Search
None
See application file for complete search history.

(56) References Cited

U.S. PATENT DOCUMENTS 5,646,818 A * 7/1997 Hahn .................... G06F 1/1616
248/917
6,031,714 A * 2/2000 Ma ....................... G06F 1/1601
248/918

(Continued)

FOREIGN PATENT DOCUMENTS

TW 201424621 7/2014
TW 201507575 2/2015

OTHER PUBLICATIONS

"Office Action of Taiwan Counterpart Application", issued on Mar. 20, 2017, p. 1-p. 10.

*Primary Examiner* — Xanthia C Cunningham
(74) *Attorney, Agent, or Firm* — Jianq Chyun IP Office

(57) ABSTRACT

A docking station adapted to an electrical device is provided. The docking station includes a base and an input device. The base has a supporting portion and a bottom plate portion. A first angle is formed between the supporting portion and the bottom plate portion. The electrical device is adapted to be supported on the supporting portion. The input device has an input portion and a leaning portion. The leaning portion leans against the supporting portion. A second angle is formed between the input portion and the leaning portion. When the supporting portion is moved relatively to the bottom plate portion to change the first angle, the supporting portion drives the input portion and the leaning portion to be moved correspondingly to change the second angle. In addition, an electrical apparatus including the docking station and the electrical device is also provided.

22 Claims, 3 Drawing Sheets

(51) Int. Cl.
  *G06F 3/042* (2006.01)
  *G06F 3/0484* (2013.01)
  *G06F 3/0485* (2013.01)

(52) U.S. Cl.
  CPC ............ *G06F 1/1677* (2013.01); *G06F 3/017* (2013.01); *G06F 3/0426* (2013.01); *G06F 3/0485* (2013.01); *G06F 3/04845* (2013.01)

(56) References Cited

U.S. PATENT DOCUMENTS

| | | | | |
|---|---|---|---|---|
| 6,185,096 B1 * | 2/2001 | Helot | ................... | G06F 1/1632 16/342 |
| 6,430,038 B1 * | 8/2002 | Helot | ................... | G06F 1/1616 248/917 |
| 6,498,720 B2 * | 12/2002 | Glad | ................... | G06F 1/1626 248/121 |
| 6,676,098 B2 * | 1/2004 | Lin | ................... | E05D 11/1007 248/371 |
| 7,567,436 B2 * | 7/2009 | Jeong | ................... | F16M 11/10 16/221 |
| 8,567,740 B2 * | 10/2013 | Tarnutzer | ............. | A47B 23/043 248/454 |
| 8,840,334 B2 * | 9/2014 | Huang | ................ | H04M 1/0237 361/679.55 |
| 2004/0005184 A1 * | 1/2004 | Kim | ...................... | G06F 1/1618 400/472 |
| 2005/0155184 A1 * | 7/2005 | Kayl | ..................... | G06F 1/1632 16/366 |
| 2006/0079277 A1 * | 4/2006 | Ditzik | ................... | G06F 1/1615 455/556.1 |
| 2007/0132894 A1 * | 6/2007 | Vitito | .................... | G06F 1/1601 348/837 |
| 2008/0024975 A1 * | 1/2008 | Huang | ................... | G06F 1/162 361/679.44 |
| 2011/0170252 A1 * | 7/2011 | Jones | ................... | G06F 1/1632 361/679.09 |
| 2012/0194738 A1 * | 8/2012 | Wang | ................... | G06F 1/1632 348/552 |
| 2013/0257733 A1 * | 10/2013 | Moore | ................. | G06F 1/1618 345/168 |
| 2014/0340829 A1 * | 11/2014 | Matsumoto | ........... | G06F 1/1616 361/679.27 |
| 2015/0138712 A1 * | 5/2015 | Solland | ................. | G06F 1/1652 361/679.27 |
| 2015/0198978 A1 * | 7/2015 | Catchpole | ............. | G06F 1/1632 345/173 |

* cited by examiner

DOCKING STATION AND ELECTRICAL APPARATUS

CROSS-REFERENCE TO RELATED APPLICATION

This application claims the priority benefits of U.S. provisional application Ser. No. 62/168,922, filed on Jun. 1, 2015. The entirety of the above-mentioned patent application is hereby incorporated by reference herein and made a part of this specification.

BACKGROUND OF THE INVENTION

1. Field of the Invention

The invention relates to a docking station and an electrical apparatus, and particularly relates to a docking station able to support an electrical device and an electrical apparatus including the docking station and the electrical device.

2. Description of Related Art

With rapid advance in science and technology, the types of the portable electrical device such as smart phone or tablet PC become more and more diverse. Compared with traditional desktop PCs or notebook computers, the advantage of the tablet PCs is in its less weight and volume.

The normal tablet PCs do not have the keyboards like the notebook PCs or the desktop PCs, so various types of external keyboard are provided for the user to operate the tablet PCs on the market. However, when the user is using the tablet PC with an external keyboard on an unstable base or base with smaller supporting area (like the thigh of the user), the keyboard can not be stably operated because of the unstable support, and the operation of the keyboard easily lead to the shaking of the screen of the tablet PC.

SUMMARY OF THE INVENTION

The present invention provides a docking station with an input device and a corresponding electrical device able to be operated stably.

The docking station of the present invention is adapted to an electrical device. The docking station includes a base and an input device. The base has a supporting portion and a bottom plate portion connected to each other. A first angle is formed between the supporting portion and the bottom plate portion. The electrical device is adapted to be supported on the supporting portion. The input device has an input portion and a leaning portion connected to each other. The leaning portion leans against the supporting portion. A second angle is formed between the input portion and the leaning portion. When the supporting portion is moved relatively to the bottom plate portion to change the first angle, the supporting portion drives the input portion and the leaning portion to be moved correspondingly to change the second angle.

The electrical apparatus of the present invention includes an electrical device and a docking station. The docking station includes a base and an input device. The base has a supporting portion and a bottom plate portion connected to each other. A first angle is formed between the supporting portion and the bottom plate portion. The electrical device is adapted to be supported on the supporting portion. The input device has an input portion and a leaning portion connected to each other. The leaning portion leans against the supporting portion. A second angle is formed between the input portion and the leaning portion. When the supporting portion is moved relatively to the bottom plate portion to change the first angle, the supporting portion drives the input portion and the leaning portion to be moved correspondingly to change the second angle.

In an embodiment of the present invention, the first angle is positively correlated to the second angle.

In an embodiment of the present invention, the leaning portion has a first magnetic element, and the leaning portion is adapted to be connected to the supporting portion through a magnetic attraction force between the first magnetic element and the supporting portion.

In an embodiment of the present invention, the supporting portion has a second magnetic element, and the second magnetic element is aligned to the first magnetic element. The leaning portion is adapted to be connected to the supporting portion through a magnetic attraction force between the first magnetic element and the second magnetic element.

In an embodiment of the present invention, the leaning portion has a leaning surface and leans against the supporting portion through the leaning surface. A width of the leaning surface is greater than or equal to a width of the first magnetic element.

In an embodiment of the present invention, the leaning portion has a leaning surface and leans against the supporting portion through the leaning surface. A geometric center of the leaning surface overlaps the first magnetic element.

In an embodiment of the present invention, the leaning portion has a leaning surface and leans against the supporting portion through the leaning surface. A geometric center of the leaning surface is located between a geometric center of the first magnetic element and an end of the leaning surface.

In an embodiment of the present invention, the leaning portion has a leaning surface and leans against the supporting portion through the leaning surface. The leaning portion has a third magnetic element at an end of the leaning surface. The leaning portion is adapted to be connected to the supporting portion through a magnetic attraction force between the third magnetic element and the base.

In an embodiment of the present invention, the base has a fourth magnetic element. The fourth magnetic element is aligned to the third magnetic element. The leaning portion is adapted to be connected to the supporting portion through a magnetic attraction force between the third magnetic element and the fourth magnetic element.

In an embodiment of the present invention, the leaning portion has a leaning surface and leans against the supporting portion through the leaning surface. The input device is adapted to receive a pressing force and perform an input operation. A component force of the pressing force is perpendicular to the leaning surface.

In an embodiment of the present invention, the input portion has an end and a bendable section opposite to each other. The bendable section is adjacent to the leaning portion and adapted to be bent to completely or partially lean against the supporting portion or the electrical device, so as to change an extended length of the input portion between the leaning portion and the end.

Based on the above, in the docking station of the present invention, the supporting portion of the base is used to support the electrical device, and the leaning portion of the input device leans against the supporting portion of the base. In such way, when the user adjusts the angle of inclination of the electrical device so that the first angle between the supporting portion and the bottom plate portion is changed. The supporting portion can drive the operation of the leaning portion of the input device to change the second angle between the leaning portion and the input portion, so as to correspondingly adjust the angle of inclination of the input portion. As a result, the user can rapidly complete the adjustment of the angle of inclination of the electrical device and the angle of inclination of the input portion simultaneously, so that the electrical device and the input portion can be in the stably operable state smoothly.

To make the above features and advantages of the invention more comprehensible, several embodiments accompanied with drawings are described in detail as follows.

DESCRIPTION OF THE EMBODIMENTS

Figure 1:
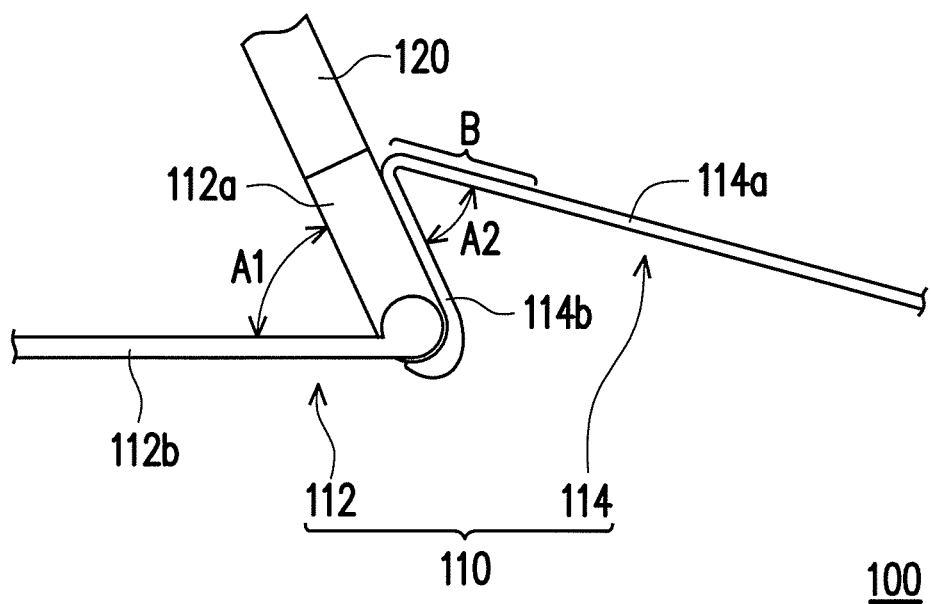
FIG. 1 is a schematic side view of an electrical apparatus according to an embodiment of the present invention.
Figure 2:
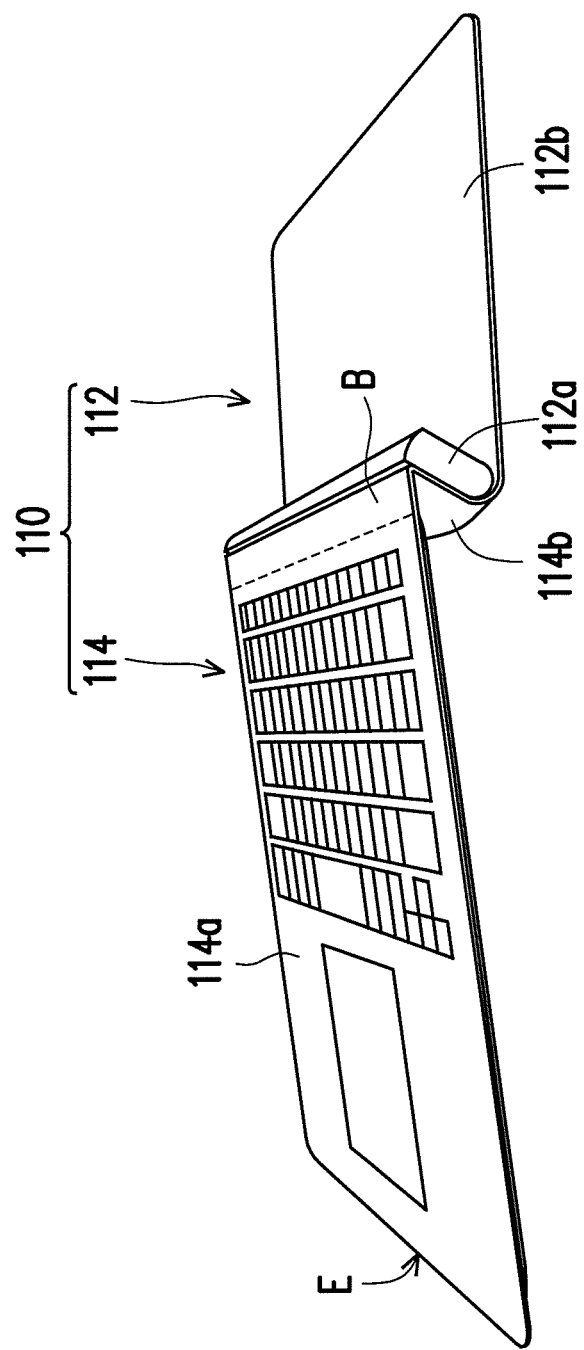
FIG. 2 is a three-dimensional view of the docking station of FIG. 1.

FIG. 1 is a schematic side view of an electrical apparatus according to an embodiment of the present invention. FIG. 2 is a three-dimensional view of the docking station of FIG. 1. Please referring to FIG. 1 and FIG. 2, the electrical apparatus 100 includes a docking station 110 and an electrical device 120. The docking station 110 includes a base 112 and an input device 114. The electrical device 120 is a tablet PC, for example, but not limited thereto. The base 112 is used to support the electrical device 120. The input device 114 is an external keyboard, for example, and used to connect the electrical device 120 through the base 112.

Specifically, the base 112 has a supporting portion 112a and a bottom plate portion 112b connected to each other. The bottom plate portion 112b is used to be placed on the support (such as the desk-top or the user's thighs). The electrical device 120 is adapted to be supported on the supporting portion 112a. The electrical device 120 is socketed into a slot of the supporting portion 112a, for example, or fixed on the supporting portion 112a through other appropriate method, the invention is not limited thereto. A first angle A1 (marked in FIG. 1) is formed between the supporting portion 112a and the bottom plate portion 112b. Specifically, the first angle A1 is an included angle of the supporting portion 112a and the bottom plate portion 112b, which is increased by a clockwise rotation of the supporting portion 112a taking the bottom plate portion 112b as a starting point. The user can apply a force on the electrical device 120 or the supporting portion 112a so that the supporting portion 112a is moved, inclined, or rotated relatively to the bottom plate portion 112b, so as to adjust the angle of inclination of the electrical device 120. The supporting portion 112a and the bottom plate portion 112b are connected through flexible material or pivot structure and can be moved, inclined, or rotated relatively, for example, but the invention is not limited thereto.

The input device 114 has an input portion 114a and a leaning portion 114b connected to each other. The leaning portion 114b is detachably connected to and leans against the supporting portion 112a. The input portion 114a includes an input interface such as keyboard module, touch module for the user's operation, and an end E of the input portion 114a (marked in FIG. 2) is used to lean against the support (such as the desk-top or the user's thighs). The leaning portion 114b of the input device 114 has an electric connection port, for example, to be electrically connected to the electrical device 120 through the supporting portion 112a, but the input device 114 can also be electrically connected to the electrical device 120 through wireless connections (such as Bluetooth). A second angle A2 (marked in FIG. 1) is formed between the input portion 114a and the leaning portion 114b. Specifically, the second angle A2 is an included angle of the input portion 114a and the leaning portion 114b, which is increased by a counterclockwise rotation of the input portion 114a taking the leaning portion 114b as a starting point. The input portion 114a and the leaning portion 114b are connected through a flexible material or pivot structure and can be bent, inclined, or rotated relatively, for example, but the invention is not limited thereto.

Figure 3:
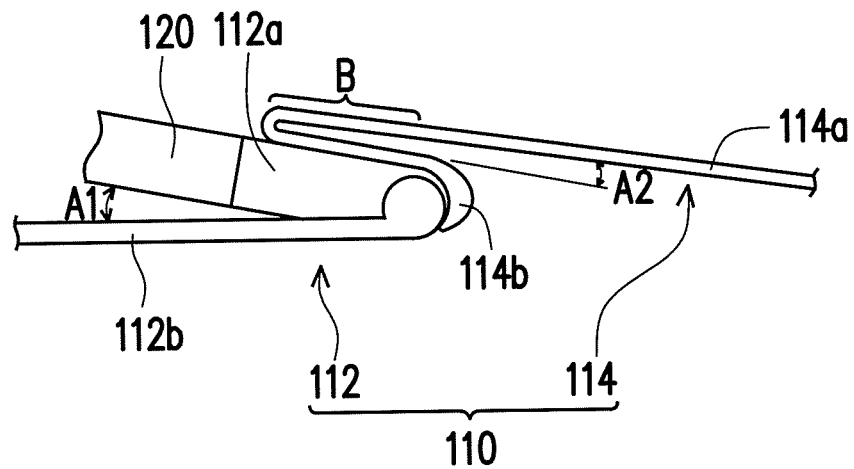
FIG. 3 illustrates the transformation of the first angle and the second angle of FIG. 1.

FIG. 3 illustrates the transformation of the first angle and the second angle of FIG. 1. As the aforementioned descriptions, the supporting portion 112a of the base 112 of embodiment is used to support the electrical device 120, and the leaning portion 114b of the input device 114 leans against the supporting portion 112a of the base 112. In such way, when the user applies a force on the electrical device 120 or the supporting portion 112a to make the supporting portion 112a moved, inclined, or rotated relatively to the bottom plate portion 112b for changing the first angle A1 between the supporting portion 112a and the bottom plate portion 112b(for example, transforming into the state illustrated in FIG. 3 from the state illustrated in FIG. 1), the supporting portion 112a drives the input portion 114a and the leaning portion 114b of the input device 114 to be moved, inclined, or rotated relatively to change the second angle A2 between the leaning portion 114b and the input portion 114a (for example, transforming into the state illustrated in FIG. 3 from the state illustrated in FIG. 1), so as to correspondingly adjust the angle of inclination of the input portion 114a. As a result, the user can rapidly complete the adjustment of the angle of inclination of the electrical device 120 and the angle of inclination of the input portion 114a simultaneously, so that the electrical device 120 and the input portion 114a can be set into the stably operable state smoothly.

In the embodiment, the first angle A1 can be adjusted to 0~70 degrees, for example, and the second angle A2 can be adjusted to 0~65 degrees, for example. The first angle A1 is greater than or equal to the second angle A2, for example, and the first angle A1 is positively correlated to the second angle A2, for example. For example, the relation between the first angle A1 and the second angle A2 can be illustrated in the following table.

| first angle A1 | second angle A2 |
| --- | --- |
| 0 degree | 0 degree |
| 5 degrees | 5 degrees |
| 10 degrees | 9 degrees |
| 15 degrees | 14 degrees |
| 20 degrees | 18 degrees |
| 25 degrees | 23 degrees |
| 30 degrees | 27 degrees |
| 35 degrees | 32 degrees |
| 40 degrees | 37 degrees |
| 45 degrees | 41 degrees |
| 50 degrees | 46 degrees |
| 55 degrees | 50 degrees |
| 60 degrees | 55 degrees |
| 65 degrees | 60 degrees |
| 70 degrees | 64 degrees |

The relation between the first angle A1 and the second angle A2 can not only be a nonlinear positive correlation as illustrated in the aforementioned table, but also can be a linear direct ratio correlation, the invention is not limited thereto.

Figure 4:
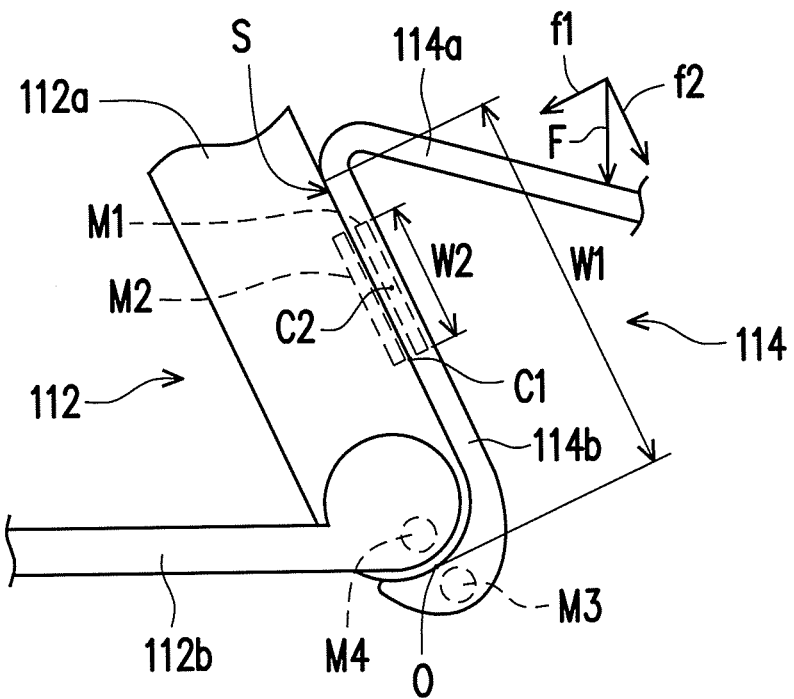
FIG. 4 is a partially enlarged view of the docking station of FIG. 1.

FIG. 4 is a partially enlarged view of the docking station of FIG. 1. Please referring to FIG. 4, in the embodiment, the leaning portion 114b has a first magnetic element M1, and the supporting portion 112a has a second magnetic element M2 aligned to the first magnetic element M1. The leaning portion 114b is adapted to be detachably connected to the supporting portion 112a through a magnetic attraction force between the first magnetic element M1 and the second magnetic element M2 of the supporting portion 112a. Specifically, the leaning portion 114b has a leaning surface S and leans against the supporting portion 112a through the leaning surface S. A width W1 of the leaning surface S is greater than or equal to a width W2 of the first magnetic element M1. The geometric center C1 of the leaning surface S overlaps the first magnetic element M1, and the geometric center C1 of the leaning surface S is located between the geometric center C2 of the first magnetic element M1 and an end O of the leaning surface S, so as to make the magnetic attraction force between the first magnetic element M1 and the second magnetic element M2 able to effectively fix the leaning portion 114b on the supporting portion 112a. In addition, the leaning portion 114b has a third magnetic element M3 at the end O of the leaning surface S, and the base 112 has a fourth magnetic element M4 aligned to the third magnetic element M3. The leaning portion 114b can be more stably connected to the supporting portion 112a through the magnetic attraction force between the third magnetic element M3 and the fourth magnetic element M4 of the base 112.

In the embodiment, when the user performs an operation of typing on the input portion 114b of the input device 114, the input portion 114b of the input device 114 receives a pressing force F (marked in FIG. 4) from the user. The pressing force F can be separated into the component force f1 and the component force f2, wherein the component force f1 is perpendicular to the leaning surface S of the leaning portion 114b. Accordingly, the leaning surface S of the leaning portion 114b can stably lean against the supporting portion 112a through the user's typing force, and the base 112 can be maintained in the appropriate position through said force.

Please referring to FIG. 1 and FIG. 2, the input portion 114a of the embodiment has a bendable section B opposite to an end E of the input portion 114a (marked in FIG. 2), for example, and the bendable section B is adjacent to the leaning portion 114b. The bendable section B is adapted to be bent upward to completely or partially lean against the supporting portion 112a or the electrical device 120, so as to change the extended length of the input portion 114a between the leaning portion 112a and the end E (marked in FIG. 2) according to the user's habits or the environment. Specifically, the bendable section B is separated into a plurality of relatively bendable sub-sections, for example. The user can make all the sub-sections lean against the supporting portion 112a or the electrical device 120 according to the demands, or make part of the sub-sections lean against the supporting portion 112a or the electrical device 120 to adjust the extended length of the input portion 114a freely. Each of the sub-sections of the bendable section B is fixed on the supporting portion 112a or the electrical device 120 through the magnetic force of the magnetic element (such as a magnet), but the invention is not limited thereto.

Based on the above, in the docking station of the present invention, the supporting portion of the base is used to support the electrical device, and the leaning portion of the input device leans against the supporting portion of the base. In such way, when the user adjusts the angle of inclination of the electrical device so that the first angle between the supporting portion and the bottom plate portion is changed, the supporting portion can drive the operation of the leaning portion of the input device to change the second angle between the leaning portion and the input portion, so as to correspondingly adjust the angle of inclination of the input portion. As a result, the user can rapidly complete the adjustment of the angle of inclination of the electrical device and the angle of inclination of the input portion simultaneously, so that the electrical device and the input portion can be set into the stably operable state smoothly. In addition, the pressing force of the user's typing on the input device can make the leaning portion of the input device stably lean against the supporting portion of the base, and make the base maintained in the appropriate position stably.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A docking station adapted to an electrical device, the docking station comprises:
   a base, having a supporting portion and a bottom plate portion connected to each other, wherein a first angle is formed between the supporting portion and the bottom plate portion, and the electrical device is adapted to be supported on the supporting portion; and
   an input device, having an input portion and a leaning portion connected to each other, wherein the leaning portion leans against the supporting portion, and a second angle is formed between the input portion and the leaning portion,
   wherein when the supporting portion is moved relatively to the bottom plate portion to change the first angle, the supporting portion drives the input portion and the leaning portion to be moved correspondingly to change the second angle.

2. The docking station according to claim 1, wherein the first angle is positively correlated to the second angle.

3. The docking station according to claim 1, wherein the leaning portion has a first magnetic element, and the leaning portion is adapted to be connected to the supporting portion through a magnetic attraction force between the first magnetic element and the supporting portion.

4. The docking station according to claim 3, wherein the supporting portion has a second magnetic element, the second magnetic element is aligned to the first magnetic element, and the leaning portion is adapted to be connected to the supporting portion through a magnetic attraction force between the first magnetic element and the second magnetic element.

5. The docking station according to claim 3, wherein the leaning portion has a leaning surface and leans against the supporting portion through the leaning surface, and a width of the leaning surface is greater than or equal to a width of the first magnetic element.

6. The docking station according to claim 3, wherein the leaning portion has a leaning surface and leans against the supporting portion through the leaning surface, and a geometric center of the leaning surface overlaps the first magnetic element.

7. The docking station according to claim 3, wherein the leaning portion has a leaning surface and leans against the supporting portion through the leaning surface, and a geometric center of the leaning surface is located between a geometric center of the first magnetic element and an end of the leaning surface.

8. The docking station according to claim 3, wherein the leaning portion has a leaning surface and leans against the supporting portion through the leaning surface, the leaning portion has a third magnetic element at an end of the leaning surface, and the leaning portion is adapted to be connected to the supporting portion through a magnetic attraction force between the third magnetic element and the base.

9. The docking station according to claim 8, wherein the base has a fourth magnetic element, the fourth magnetic element is aligned to the third magnetic element, and the leaning portion is adapted to be connected to the supporting portion through a magnetic attraction force between the third magnetic element and the fourth magnetic element.

10. The docking station according to claim 1, wherein the leaning portion has a leaning surface and leans against the supporting portion through the leaning surface, the input device is adapted to receive a pressing force and perform an input operation, and a component force of the pressing force is perpendicular to the leaning surface.

11. The docking station according to claim 1, wherein the input portion has an end and a bendable section opposite to each other, and the bendable section is adjacent to the leaning portion and adapted to be bent to completely or partially lean against the supporting portion or the electrical device, so as to change an extended length of the input portion between the leaning portion and the end.

12. An electrical apparatus, comprising:
  an electrical device; and
  a docking station, comprising:
    a base, having a supporting portion and a bottom plate portion connected to each other, wherein a first angle is formed between the supporting portion and the bottom plate portion, and the electrical device is adapted to be supported on the supporting portion; and
    an input device, having an input portion and a leaning portion connected to each other, wherein the leaning portion leans against the supporting portion, and a second angle is formed between the input portion and the leaning portion,
    wherein when the supporting portion is moved relatively to the bottom plate portion to change the first angle, the supporting portion drives the input portion and the leaning portion to be moved correspondingly to change the second angle.

13. The electrical apparatus according to claim 12, wherein the first angle is positively correlated to the second angle.

14. The electrical apparatus according to claim 12, wherein the leaning portion has a first magnetic element, and the leaning portion is adapted to be connected to the supporting portion through a magnetic attraction force between the first magnetic element and the supporting portion.

15. The electrical apparatus according to claim 14, wherein the supporting portion has a second magnetic element, the second magnetic element is aligned to the first magnetic element, and the leaning portion is adapted to be connected to the supporting portion through a magnetic attraction force between the first magnetic element and the second magnetic element.

16. The electrical apparatus according to claim 14, wherein the leaning portion has a leaning surface and leans against the supporting portion through the leaning surface, and a width of the leaning surface is greater than or equal to a width of the first magnetic element.

17. The electrical apparatus according to claim 14, wherein the leaning portion has a leaning surface and leans against the supporting portion through the leaning surface, and a geometric center of the leaning surface overlaps the first magnetic element.

18. The electrical apparatus according to claim 14, wherein the leaning portion has a leaning surface and leans against the supporting portion through the leaning surface, and a geometric center of the leaning surface is located between a geometric center of the first magnetic element and an end of the leaning surface.

19. The electrical apparatus according to claim 14, wherein the leaning portion has a leaning surface and leans against the supporting portion through the leaning surface, the leaning portion has a third magnetic element at an end of the leaning surface, and the leaning portion is adapted to be connected to the supporting portion through a magnetic attraction force between the third magnetic element and the base.

20. The electrical apparatus according to claim 19, wherein the base has a fourth magnetic element, the fourth magnetic element is aligned to the third magnetic element, and the leaning portion is adapted to be connected to the supporting portion through a magnetic attraction force between the third magnetic element and the fourth magnetic element.

21. The electrical apparatus according to claim 12, wherein the leaning portion has a leaning surface and leans against the supporting portion through the leaning surface, the input device is adapted to receive a pressing force and perform an input operation, and a component force of the pressing force is perpendicular to the leaning surface.

22. The electrical apparatus according to claim 12, wherein the input portion has an end and a bendable section opposite to each other, and the bendable section is adjacent to the leaning portion and adapted to be bent to completely or partially lean against the supporting portion or the electrical device, so as to change an extended length of the input portion between the leaning portion and the end.

* * * * *